United States Patent
Gibson et al.

(10) Patent No.: US 8,014,283 B2
(45) Date of Patent: Sep. 6, 2011

(54) SYSTEM AND METHOD FOR TOPOLOGY CONSTRAINED QOS PROVISIONING

(75) Inventors: Robert T. Gibson, Ottawa (CA); James H. Buchanan, Ottawa (CA); Lawrence MacFadyen, Kanata (CA); Ross MacCharles, Kanata (CA); Mark Jamensky, Ottawa (CA)

(73) Assignee: Fujitsu Limited, Kawasaki (JP)

( * ) Notice: Subject to any disclaimer, the term of this patent is extended or adjusted under 35 U.S.C. 154(b) by 1064 days.

(21) Appl. No.: 10/134,285

(22) Filed: Apr. 29, 2002

(65) Prior Publication Data

US 2002/0186664 A1    Dec. 12, 2002

Related U.S. Application Data

(60) Provisional application No. 60/295,142, filed on Jun. 1, 2001.

(51) Int. Cl.
    *G01R 31/08*      (2006.01)
(52) U.S. Cl. .................. 370/231; 370/252; 370/255
(58) Field of Classification Search .............. 370/229, 370/230, 235, 254–258, 397, 395.2, 295.53, 370/409, 410; 715/733–739; 709/220–226, 709/249, 250
See application file for complete search history.

(56) References Cited

U.S. PATENT DOCUMENTS

| | | | |
|---|---|---|---|
| 5,793,763 A | 8/1998 | Mayes et al. | |
| 5,881,243 A | 3/1999 | Zaumen et al. | |
| 6,163,527 A | 12/2000 | Ester et al. | |
| 6,167,445 A * | 12/2000 | Gai et al. | 709/223 |
| 6,178,505 B1 | 1/2001 | Schneider et al. | |
| 6,226,748 B1 | 5/2001 | Bots et al. | |
| 6,226,751 B1 * | 5/2001 | Arrow et al. | 726/15 |
| 6,339,595 B1 | 1/2002 | Rekhter et al. | |
| 6,449,650 B1 * | 9/2002 | Westfall et al. | 709/228 |
| 6,526,056 B1 | 2/2003 | Rekhter et al. | |
| 6,539,483 B1 * | 3/2003 | Harrison et al. | 726/1 |
| 6,577,327 B1 * | 6/2003 | Rochford et al. | 715/735 |
| 6,625,773 B1 | 9/2003 | Boivie et al. | |
| 6,633,563 B1 | 10/2003 | Lin et al. | |
| 6,701,358 B1 | 3/2004 | Poisson et al. | |
| 6,751,729 B1 | 6/2004 | Giniger et al. | |
| 6,760,330 B2 | 7/2004 | Tahan | |
| 6,765,591 B2 * | 7/2004 | Poisson et al. | 715/735 |
| 6,871,233 B1 * | 3/2005 | Bearden et al. | 709/226 |
| 6,880,127 B1 | 4/2005 | Arquie | |
| 6,915,351 B2 | 7/2005 | Tahan | |
| 6,944,183 B1 | 9/2005 | Iyer et al. | |

(Continued)

OTHER PUBLICATIONS

World Wide Web, http://www.cisco.com/univercd/cc/td/doc/product/rtmgmt/vpnsc/mpls/1_1/user_gd/, Cisco Systems, "MPLS VPN User Guide", printed on Feb. 8, 2002, 1 page.

(Continued)

*Primary Examiner* — Seema S. Rao
*Assistant Examiner* — Wanda Russell
(74) *Attorney, Agent, or Firm* — Marc A. Hubbard; Gardere Wynne & Sewell LLP (57) ABSTRACT

A system and method for topology constrained Quality of Service (QoS) provisioning between a plurality of sites in a Virtual Private Network (VPN) is disclosed. The method comprises enabling graphical definition of relationships between the plurality of sites of the VPN and enabling graphical definition of at least one QoS rule for at least one pair of sites of the plurality of sites of the VPN based at least in part on the defined relationship.

25 Claims, 5 Drawing Sheets

U.S. PATENT DOCUMENTS

| | | |
|---|---|---|
| 7,096,495 B1 | 8/2006 | Warrier et al. |
| 2002/0099669 A1* | 7/2002 | Lauer .............................. 705/80 |
| 2003/0039212 A1 | 2/2003 | Lloyd et al. |
| 2003/0140131 A1* | 7/2003 | Chandrashekhar et al. .. 709/223 |
| 2005/0025069 A1 | 2/2005 | Aysan |
| 2007/0019676 A1* | 1/2007 | Kompella ..................... 370/468 |

OTHER PUBLICATIONS

World Wide Web, http://www.ietf.org/rfc/rfc2547.txt, E. Rosen, et al., "BGP/MPLS VPNs", Mar. 1999, pp. 1-24, printed on Feb. 6, 2002.

World Wide Web, http://www.ietf.org/internet-drafts/draft-tequila-sis-01.txt, Danny Gorderis, et al., "Service Level Specifications Semantics, Parameters and negotiation requirements", Jun. 2001, pp. 1-28, printed on Feb. 6, 2002.

World Wide Web, http://www.cisco.com/univercd/cc/td/doc/product/rtmgmt/vpnsc/mpls/1_1/user_gd/, Cisco VPN Solutions Center: MPLS Solution User Guide, "Getting Started with the MPLS VPN Solutions Center", 2000, pp. 3-1 to 3-46.

World Wide Web, http://www.cisco.com/univercd/cc/td/doc/product/rtmgmt/ypnsc/mpls/1_1/user_gd/, Cisco VPN Solutions Center: MPLS Solution User Guide, "Getting Started with the MPLS VPN Solutions Center", 2000, pp. 3-1 to 3-46.

K. Muthukrishnan et al., "A Core MPLS IP VPN Architecture" [online], Sep. 2000 [retrieved on Dec. 21, 2005]. Retrieved from the Internet URL: <http://www.rfc-archlve.org/getrfc.php?rfc=2917>, pp. 1-15.

Chuck Semeria, "RFC 2547bis: BGP/MPLS VPN Hierarchical and Recursive Applications", Juniper Networks, Inc., Part No. 200014-0002, Jul. 2001, pp. 1-43.

"Part 3: Carrier sense multiple access with collision detection (CSMA/CD) access method and physical layer specifications", in: IEEE Std. 802.3, 2000 Edition, pp. 40-50.

Yates, Jennifer et al., "Reconfiguration in IP Over WDM Access Networks", AT&T Labs-Research, AT&T Shannon Laboratories, 4 pages Mar. 2000.

Varadarajan, Suba et al., "Virtual Local Area Networks" [online], Aug. 14, 1997 [retrieved on Feb. 7, 2000], Retrieved from the Internet URL: http://www.cis.ohio-state.edu/-jain/cis788-97/virtual_lans/index.htm>, pp. 1-12.

Peter Aswood-Smith et al., "Generalized MPLS Signaling - RSVP-TE Extensions" [online], Nov. 2000 [retrieved on Feb. 16, 2007]. Retrieved from the Internet: URL: http://tools.ietf.org/html/draft-ietf-mpls-generalized-rsvp-te-04> pp. 1-21.

Eric C. Rosen et al., "Multlprotocol Label Switching Architecture" [online], Jul. 2000 [retrieved on Feb. 16, 2007]. Retrieved from the Internet URL: <http://tools.ietf.org/html/draft-ietf-mpls-arch-07> pp. 1-61.

* cited by examiner

SYSTEM AND METHOD FOR TOPOLOGY CONSTRAINED QOS PROVISIONING

CROSS-REFERENCE TO RELATED APPLICATIONS

This patent application claims the benefit of Provisional Patent Application Ser. No. 60/295,142, entitled System and Method for Topology Constrained QoS Provisioning, filed on Jun. 1, 2001, the disclosure of which is incorporated herein by reference.

TECHNICAL FIELD OF THE INVENTION

The present invention relates generally to the field of telecommunications and more particularly to a system and method for topology constrained Quality of Service (QoS) provisioning.

BACKGROUND OF THE INVENTION

It is a unique aspect of a Virtual Private Network (VPN) that only certain sites are allowed to exchange packets with one another. Existing provisioning systems allow an operator of a service provider to configure the sites so that one site can talk to a second site but not to a third site. The service provider may be an ILEC (Incumbent Local Exchange Carrier), a CLEC (Competitive Local Exchange Carrier), an ICX (Incoming Exchange), an ISP (Internet Service Provider), and/or the like. In order to operate properly it is desirable that the provisioning system be aware of the rules governing the communication between different sites of a VPN and allow configuration of the VPN based on those rules.

Existing provisioning systems allow an operator to provision Quality of Service (QoS) on different nodes supporting a VPN. However, such systems do not correlate provisioning of QoS to the topology of the VPN. Thus, provisioning of QoS can be error prone and inefficient and not sufficiently tied to the specific requirements of site-to-site service level guarantees in the VPN.

SUMMARY OF THE INVENTION

Accordingly, especially with the introduction of newer technologies, such as Border Gateway Protocol 4 (BGP) and Multi-protocol Label Switching (MPLS), there is a need in the art for a system and method for Quality of Service (QoS) provisioning in a network, such as topology constrained QoS provisioning in a Virtual Private Network (VPN), for example a BGP MPLS VPN. In the preferred embodiment, the present invention allows topology constrained QoS provisioning in a VPN by capturing the provisioning operator's intent regarding the sites that are allowed to communicate with each other.

A system and method for provisioning QoS relationships between customer sites constrained by the topology of the VPN is disclosed. In the preferred embodiment, this is accomplished by interpreting and understanding the rules governing VPN topology as specified, for example by BGP/MPLS rules and then allowing the provisioning operator to provision QoS relationships for logical communication channels only between those sites of the VPN which have the right to exchange traffic with one another. These QoS relationships then take effect in the provider network.

The method comprises enabling graphical definition of relationships between the plurality of sites of the VPN and enabling graphical definition of at least one QoS rule for at least one pair of sites of the plurality of sites of the VPN based at least in part on the defined relationship.

Accordingly, it is a technical advantage of an exemplary provisioning system of the present invention that it is capable of understanding, displaying, storing and configuring VPNs in a provider network.

It is another technical advantage of an exemplary embodiment provisioning system that it is capable of understanding, displaying, storing and configuring the VPN topology and QoS provisioning, preferably in terms of the sites which are interconnected by VPN components and the type of VPN components, wherein the topology of the VPN components specifies the topology or permitted communication relationships between the sites.

It is yet another technical advantage of an exemplary embodiment provisioning system that it is capable of understanding, displaying, storing and configuring QoS specifications for point-to-point and/or point-to-multipoint communication paths between the sites of a VPN.

It is yet another technical advantage of an exemplary embodiment provisioning system that it is capable of understanding and using the VPN topology for each VPN to constrain subsequent QoS provisioning operations between sites, wherein the set of point-to-point and/or point-to-multipoint service level specifications for communication paths between sites is restricted to those other sites with permitted communication relationships, as opposed to the set of all sites reachable via an underlying shared packet switched network.

Other aspects and features of the invention will become apparent to those ordinarily skilled in the art upon review of the following description of specific embodiments of the invention in conjunction with the accompanying figures.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

The preferred embodiment of the present invention and its advantages are best understood by referring to FIGS. 1 through 6 of the drawings, like numerals being used for like and corresponding parts of the various drawings.

Figure 1:
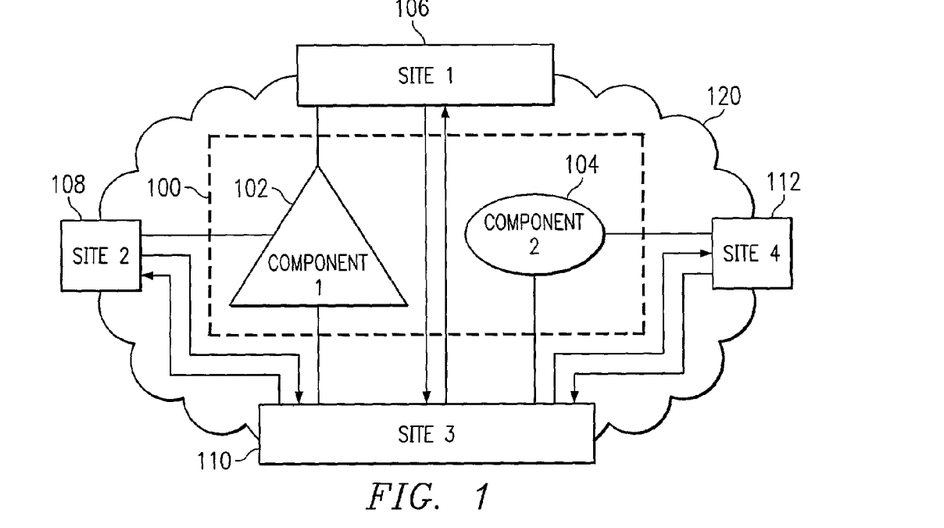
FIG. 1 shows the topology of an exemplary Virtual Private Network (VPN) according to a preferred embodiment of the present invention.

FIG. 1 shows the topology 100 of an exemplary network, for example an exemplary Virtual Private Network (VPN). As illustrated in FIG. 1 topology 100 comprises one or more VPN components 102 and 104. Each of the VPN components may have either a hub-spoke configuration or a mesh configuration. In the exemplary embodiment of FIG. 1 component 102 has a hub-spoke configuration and component 104 has a mesh configuration. Topology 100 also comprises one or more sites 106, 108, 110 and 112 connected by an underlying network 120.

It is a unique aspect of Border Gateway Protocol 4 (BGP) and Multi-protocol Label Switching (MPLS) VPNs that the VPN connectivity is provided by a dedicated provider edge-customer edge (PE-CE) peering relation combined with a shared packet-switched network operable to deliver packetized data between nodes/sites thereof in an appropriately formatted protocol, e.g. IP, User Datagram Protocol (UDP), and/or the like. The underlying network 120 may be embodied with any number of general transmission technologies. In an embodiment, the underlying network 120 is a fiber optic network carrying MPLS and IP formatted data therebetween and, accordingly, the nodes may be implemented as optical transport nodes although the particular transmission medium is irrelevant with regard to the scope of the invention. While the present invention contemplates an implementation on an optical network, the invention as described herein is not intended to be limited thereto and, accordingly, underlying network 120 may be any type of network capable of packet-switched data transmissions between various nodes thereof.

In the preferred embodiment, the BGP MPLS VPN topology is governed by constrained distribution of routing information between sites using the concept of Route Target attributes which are sent with routing updates. Any two sites of the VPN which are able to share routing information are said to be topologically related. If an underlying network transport mechanism, such as MPLS, exists to securely carry packets between sites that are topologically related, then the sites are able to communicate over the VPN.

Sites which are connected in a mesh configuration may exchange packets with one another. The mesh interconnection is useful for connecting sites, such as regional headquarters so that the different regional headquarters can exchange data with one another. In the preferred embodiment, a mesh VPN component employs one Route Target Tm(x). A BGP process serving each of the sites belonging to the mesh imports routes tagged with Route Target Tm(x) and exports routes tagged with Route Target Tm(x).

Sites which are connected in a hub-spoke configuration typically have restrictions on the exchange of packets. A site which is a hub may exchange packets with any spoke in that component, while a site which is connected as a spoke may only exchange packets with the hub. The hub-spoke arrangement is useful for connecting sites, such as sales offices in a particular region to the corresponding regional headquarters. In such an arrangement, the regional headquarters could be the hub and the sales offices could be the spokes. Thus, data from the sales office in a particular region can be transmitted to the regional headquarters from where it might be sent to other sales offices in the same region or to the headquarters of a different region.

In the preferred embodiment, a hub-spoke VPN component employs two Route Targets—Th(x) for the hub and Ts(y) for the spokes. The BGP process serving the hub site imports routes tagged with Ts(y) and exports routes tagged with Th(x). The BGP process serving the spoke site imports routes tagged with Th(x) and exports routes tagged with Ts(y).

In the exemplary embodiment shown in FIG. 1, site 1 is a spoke of hub-spoke VPN component 1; site 2 is a spoke of hub-spoke VPN component 1; site 3 is the hub of hub-spoke VPN component 1 and is also a member of mesh VPN component 2; and site 4 is a member of mesh VPN component 2. Thus, site 1 can only exchange packets with site 3; site 2 can only exchange packets with site 3; site 4 can only exchange packets with site 3; and site 3 can exchange packets with site 1, site 2, and site 4. Connections between sites and VPN components are representative of the VPN topology and connections between the sites reflect the constrained topology upon which provisioning may be based.

Route Targets may be used to describe the topology of a VPN, for example the permitted combination of sites which may communicate securely over the VPN. A Virtual Routing Forwarding (VRF) table associated with a particular site S is populated only with routes that lead to other sites which have at least one VPN in common with site S. This prevents communication between sites which have no VPN in common. Every VRF is associated with one or more Route Target attributes. These are carried in BGP as attributes of the route. Any route associated with a Route Target T is distributed to every Provider Edge (PE) router that has a VRF associated with Route Target T. When such a route is received by a PE router, it is eligible to be installed on those of the PE's VRFs which are associated with Route Target T. An Export Target is a Route Target that a PE router attaches to a route received from site S. An Import Target is a Route Target that a PE router uses to determine whether a route received from another PE router could be placed in the VRF associated with site S. A particular VPN IPv4 route is eligible for installation in a particular VRF if there is some Route Target which is both one of the route's Route Targets and one of the VRF's Import Target.

Communication paths connecting the sites may be one of two general types: pipes and hoses. Pipes are defined herein as point-to-point communication channels between two sites and are operable to provide unidirectional or bi-directional communications with QoS (Quality of Service) guarantees for packets flowing between the two sites that terminate the pipe. A hose is defined herein as a collection of communication channels that allow point-to-multipoint communication between a site and other sites and is thus an interconnection between three or more sites. A hose is preferably operable to provide unidirectional or bi-directional communications with QoS guarantees for packets flowing between the nodes that terminate the hose.

The topology of a BGP MPLS VPN is not immediately evident from the capabilities of the underlying transport network which may offer communication between all PE nodes. Therefore, an understanding of the application of Route Targets, their import and export control, and BGP protocol behavior is desirable to properly determine the topology of the BGP MPLS VPN. It is desirable that the provisioning system be aware of the rules governing communication between different sites of the VPN and allow configuration of the VPN based on those rules.

Preferably a Management and Control System (MCS) 201 (FIG. 2), which is preferably a client-server based software system, is utilized for topology constrained QoS and routing policy provisioning according to the preferred embodiment of the present invention. A user interface 200 associated with MCS 201 allows a provisioning operator to graphically create the topological relationship between different sites. User interface 200 preferably also allows the provisioning operator to graphically set-up QoS and routing relationships between the different sites. However, user interface 200 only allows QoS and routing relationships to be set-up based on the constraints of the underlying topology. Thus, by being aware of the rules corresponding to the topology, MCS 201 allows provisioning of QoS and routing relationships based on the topology. MCS 201 captures the provisioning operator's intent, performs the desirable validation and translation into routing rules for different sites of the VPN, stores the information in a database, and transmits it to the appropriate routers, switches and/or devices of the network.

A pointing device, such as a mouse, a trackball and/or the like, which controls a graphical pointer on a display may be used. The graphical pointer is used to provide feedback to the provisioning operator. Utilizing the pointing device, the provisioning operator may point to a desired selection and receive feedback by viewing the graphical pointer. Furthermore, pointing and clicking on a representation of a VPN element by keeping the button of the pointing device depressed would allow the provisioning operator to 'drag' the selected VPN element. Releasing the button of the pointing device would allow the provisioning operator to 'drop' the selected VPN element.

Figure 2:
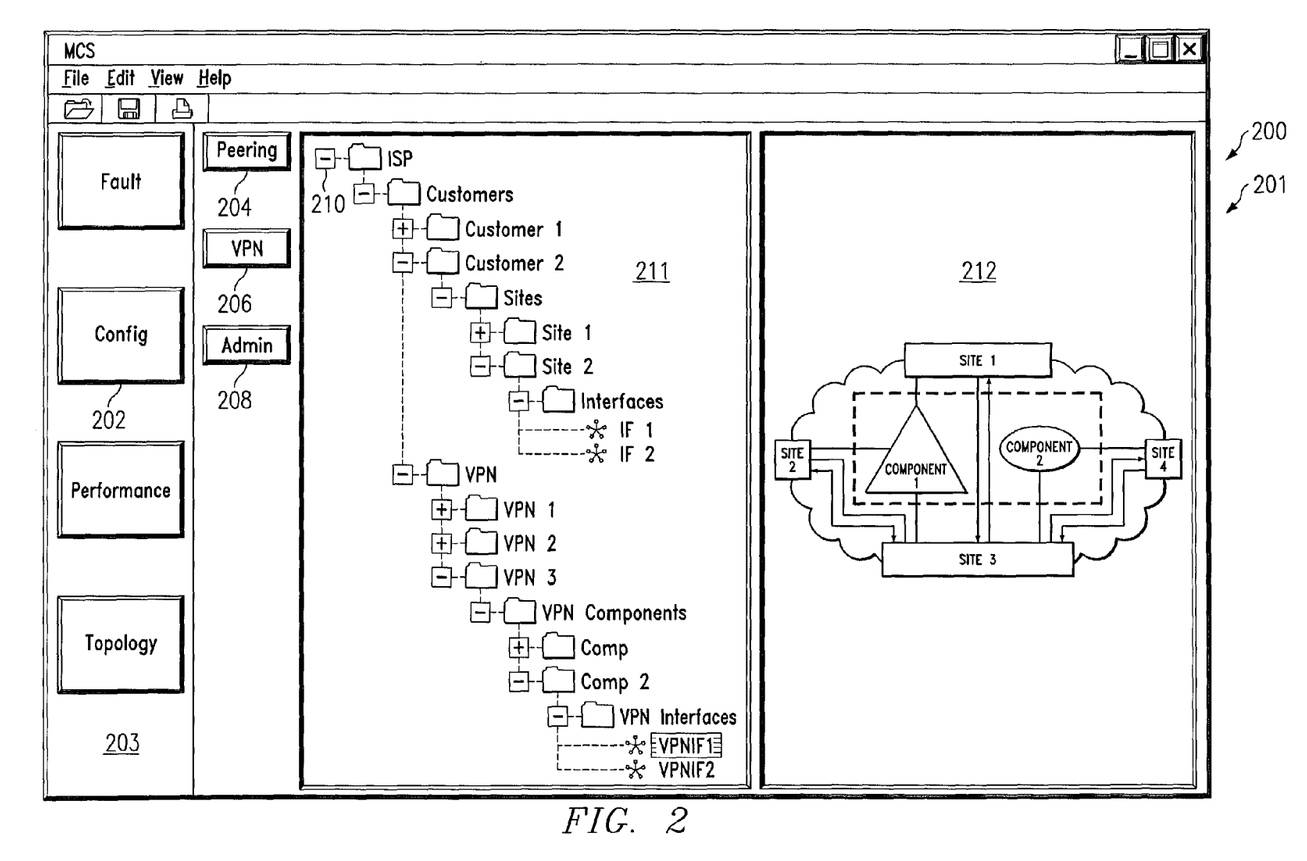
FIG. 2 shows an exemplary screen display of a preferred embodiment of a management and control system of the present invention.

FIG. 2 shows an exemplary screen display of the preferred embodiment MCS 201 of the present invention. User interface 200 of MCS 201 preferably comprises a configuration area 203, a customer area 211 and a display area 212. Preferably the VPN configuration capabilities are accessed by clicking on a Config icon 202. The configuration application preferably includes one or more tabs for selecting the Config task areas. For example, as illustrated, the configuration application includes three task areas—Peering 204, VPN 206 and Admin 208. Each task area preferably displays a VPN tree 210 in customer area 211 with the appropriate data included in the tree. Display area 212 to the right of VPN tree 210 can have different views depending on the object selected in VPN tree 210. The views may be list, graphical, no context, and/or the like.

FIG. 2 shows an exemplary screen display when the VPN tab 206 is selected. Within the context of the VPN tab, an operator can toggle between one or more views—VPN topology, VPN QoS, Topology/QoS Overlay, and/or the like. Preferably, the view can be changed by selecting the appropriate view under the "View" pull down menu.

VPN tree 210 shows a containment relationship of the various data objects in a VPN. Preferably when configuring VPNs, VPN tree 210 includes one or more of the following data categories: service provider, customers, sites, site interfaces, VPNs, VPN components, VPN interfaces, and/or the like. In the preferred embodiment, when the selected view is VPN QoS or Topology/QoS Overlay VPN tree 210 preferably contains QoS templates, for example, for differentiated services (DiffServ), policing, IP header classification, queuing parameters, and/or the like. Preferably the different data categories appear as folder icons on VPN tree 210. Object instances reside within the data category folder icon on VPN tree 210. Preferably there is no category folder for Service Provider as in the preferred embodiment the provisioning operator will be logged on as a representative of a particular Service Provider.

A list view displays the items contained within the current VPN tree node selection. For example, clicking on the Customers folder preferably displays a list of all customers in the folder, preferably one per row. Clicking on a tree leaf—for example, a specific Site Interface, displays the leaf as a single table row.

In the preferred embodiment, for VPN tab 206, the list view data for various tree elements is as shown in Table I:

TABLE I

| TREE DATA ELEMENT | LIST VIEW DATA |
| --- | --- |
| Customer | Name, Postal Address, Billing Address, Shipping Address, Contact Information |

TABLE I-continued

| TREE DATA ELEMENT | LIST VIEW DATA |
| --- | --- |
| Site | Name, IP Address, Contact, Route Distinguisher |
| Site Interface | Name, interface IP Address, Subnet Mask, Route Distinguisher |
| VPN | Name, ID, Type |
| VPN Component | Name, Component Number, Component Topology, Primary Route Target, Secondary Route Target |
| VPN Interface | VPN ID, VPN Component ID, Component Role, Primary (Boolean), Member Label |

A graphical view preferably shows the VPN components and the associated relationships for the most recently selected VPN. If the user clicks on a non-VPN data item in VPN tree 210, such as a customer, the most recently selected VPN remains on the graphical display. The individual VPN elements may be shown graphically. Thus, as shown in FIG. 1, a hub-spoke VPN component may be shown by a triangle; a mesh VPN component may be shown by an ellipse; and a site may be shown by a rectangle. Preferably a single click on a VPN component selects the corresponding entry in VPN tree 210 and a single click on a link between a site and a VPN component selects the corresponding VPN interface in VPN tree 210.

Utilizing the user interface of the present invention a VPN, a customer, and/or a site may be added by right clicking on a customer entry and making the appropriate selection from a pop-up menu. The details for the particular selection can then be filled in.

For example, a site interface may be added by right clicking on a site entry and making the appropriate selection from the pop-up menu. The details for the site interface can then be filled in. The site interface details window preferably contains one or more of the following data fields to be filled by the provisioning operator: Name, interface IP Address, Subnet Mask, Route Distinguisher, and/or the like. The default site interface name is the customer equipment name concatenated with the interface IP address. The site interface may be displayed on the graphical view by dragging and dropping one or more site interfaces from VPN tree 210 onto a VPN component on VPN tree 210 or display area 212.

When a site interface is added to a VPN component on the graphical view, the corresponding site graphic is added to the graphical view. A corresponding VPN interface is created in VPN tree 210 under the component. The name of the VPN interface defaults to VPNIF n where n is the next available integer.

A line designating a site's membership in a VPN component connects the site to the VPN component. If the VPN component is a hub-spoke VPN component, the first interface added becomes the hub and other interfaces become the spoke. If desired, however, the designation of an interface as a hub or a spoke can be changed. Also, if desired, a default communication channel, such as a hose, is added between the site and the VPN component. A default Policing template and DiffServ template are also preferably applied to the communication channel. For example, a default policing template may be for Best Effort (BE) traffic to the line rate and a traffic envelope of "any". Alternatively, user provisioned defaults may be used, if desired.

A VPN component may be added to an existing VPN entry by right clicking on a VPN entry and making the appropriate selection from a pop-up menu. The details for the VPN component may then be filled in. The VPN component details window preferably contains one or more of the following data fields to be filled by the provisioning operator: Name, Component Number, Component Topology, Primary Route Target, Secondary Route Target, and/or the like.

A Policing Template may be added by right clicking on a Templates Folder (not shown) and making the appropriate selection, for example "Add Policing Template", from a pop-up menu. The details for the Policing Template may then be filled in. The Policing Template details window preferably comprises one or more of the following data fields to be filled by the provisioning operator: Template Name, ICR (Ingress Commit Rate), IPR (Ingress Peak Rate), ECR (Egress Commit Rate), EPR (Egress Peak Rate), ICTBS (Ingress Commit Token Bucket Size), IPTBS (Ingress Peak Token Bucket Size), ECTBS (Egress Commit Token Bucket Size), EPTBS (Egress Peak Token Bucket Size), and/or the like.

A DiffServ Template may be added by right clicking on the Templates Folder and making the appropriate selection, for example "Add DiffServ Template", from the pop-up menu. The details for the DiffServ Template may then be filled in. The DiffServ Template details window preferably comprises one or more of the following data fields to be filled by the provisioning operator: a Template Name, a Differentiated Services Code Point (DSCP) map, a 5-tuple map, and/or the like.

In the preferred embodiment, the DiffServ template specifies the classification criteria for the packet flow which is subject to the QoS of the related communication channel between the sites of the VPN. The DSCP map preferably specifies a set of DiffServ code points in the packet header which identify the packets which are subject to the specified QoS. The 5-tuple map specifies a set of match criteria on fields in the packet header, for example, protocol, source address, destination address, source port, and destination port.

A communication channel, such as a hose or a pipe, between sites can be added by right clicking a VPN component to which the sites are connected. A dialog box appears with one section for hoses and one section for pipes. Preferably, sites are added to the hoses list and/or the pipes list. The hoses list may contain multiple entries and the pipes list may contain two entries—one for each endpoint of the pipe. Preferably the graphical display is updated to reflect the updating of the communication channels. Different colored lines may be used to denote the pipes and hoses.

The set of sites which are candidates for addition to the hoses list is computed and constrained preferably based on the component topology and site membership in the component. The set of sites which are candidates for addition as pipe endpoints is similarly restricted. These restrictions are preferably based on removing the already selected set of sites related to the communication channel from the total set of sites which are directly reachable through a hub-spoke topology or a mesh topology for the VPN components the sites in question are members of. Thus, the number of sites presented to the provisioning operator for consideration is significantly reduced.

A Policing template and/or a DiffServ template of a communication channel may be updated by the provisioning operator by simply dragging and dropping the appropriate template onto a graphical communication channel. If desired, a communication channel's Policing and/or DiffServ data may be changed to something outside of a preconfigured template by clicking on the graphical link and making the desired changes in a dialog box that appears in response to the clicking of the graphical link.

Figure 3:
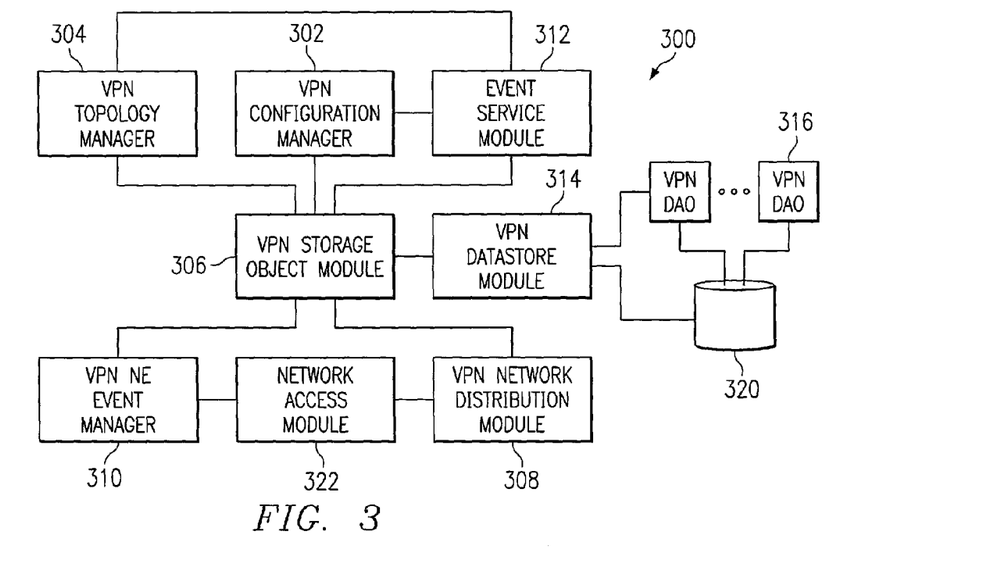
FIG. 3 shows a preferred embodiment architecture of a server of the present invention.

FIG. 3 shows a preferred embodiment architecture of a server 300 of the present invention. As illustrated, server 300 preferably comprises a VPN Configuration Manager 302, a VPN Topology Manager 304, a VPN Storage object module 306, a VPN Network Distribution module 308, a VPN NE Event Manager 310, an Event Service module 312, a VPN Datastore module 314, one or more VPN Data Access Objects (DAOs) 316, a database 320, and a Network Access module 322. VPN Configuration Manager 302 is preferably coupled to VPN Storage object module 306 and Event Service module 312. Event Service module 312 is preferably coupled to VPN Storage object module 306 and VPN Topology Manager 304. VPN Storage object module 306 is preferably coupled to VPN Topology Manager 304, VPN Network Distribution module 308, VPN NE Event Manager 310, and VPN Datastore module 314. VPN Datastore module 314 is coupled to VPN DAOs 316 and database 320. Network Access module 322 is coupled to VPN NE Event Manager 310 and VPN Network Distribution module 308.

The server architecture may be realized on any general purpose computing platform in which a sufficient development infrastructure and framework supporting application development is available. In the preferred embodiment, Java Software Development Kit (JDK), Java Runtime Environment (JRE) and other third party software tools are utilized.

A details object encapsulates data model entities, such as customers, VPNs, VPN components, sites, site interfaces, provider edge nodes and interfaces, communication channels, policing profiles, DiffServ profiles, and/or the like, that are used preferably by both a client and server 300. These objects enable the client and the server to realize an internal computational model of the VPN topology and related communication channels. They also facilitate communication of information between the client and server 300.

In the preferred embodiment, the details object includes only the core information of the data it encapsulates and preferably does not store references to related objects. In cases, where references to other objects are desirable in a details object, the references are stored as unique IDs. Preferably the unique IDs are hidden from the clients. Also preferably details objects do not support one-to-many relationships. For example, a customer details object should not attempt to encapsulate references to its VPNs because the number of VPNs can be very large.

Server 300 supports storage and retrieval of one or more topology objects. Topology objects preferably map topology data to details objects for a given view. The view preferably uses the topology object to render its graphics. For example, a site topology object preferably includes: view type ID, x, y coordinates, icon object, site details object for a given site, and/or the like. A pipe topology object preferably includes: view ID, icon object, details objects for the two VPN Interfaces connected by the pipe, a PipeReservation details object for the pipe, and/or the like. The PipeReservation details object preferably contains information pertaining to the policing profile and the DiffServ classification profile of the associated pipe.

A request object preferably encapsulates details that event listeners interrogate for information on events, such as a ConfigurationChangeEvent, a VPNConfigChange event, a VPNTopologyChange event and/or the like. For example, a ConfigurationChangeEvent object contains references to the details objects that have changed. Generally, each event object will map to a pair of Manager Application Programming Interfaces (APIs). For example, a "VPNComponentMembershipChangeEvent" object maps to "addVPNInterfacetoVPNComponent" and "removeVPNInterfacefromVPNComponent".

A VPNConfigChange event refers to changes to the configuration data or data relationships. It is triggered by VPN Storage object module 306 after a successful change to the VPN Configuration data model data. A create, delete, or modify operation on a VPN data triggers a configuration event. A VPNTopologyChange event refers to changes in existing topology data in database 320. It is triggered by VPN Storage object module 306 after a successful change to VPN topology data in VPN Datastore module 314.

VPN Configuration Manager 302 is preferably instantiated the first time a client attempts to access its services. VPN Configuration Manager 302 maintains a reference to VPN Storage object module 306. Preferably, VPN Configuration Manager 302 registers itself as a listener with Event Service module 312 to listen for configuration change events. VPN Configuration Manager 302 may perform one or more of the following functions: allow clients to register for VPN configuration change events through a framework, notify client listeners of VPN configuration changes through the framework, receive client requests for VPN configuration changes and map them to request objects, update VPN Storage object module 306 with any changes to the VPN configuration, and/or the like.

VPN Topology Manager 304 is preferably instantiated the first time a client attempts to access its service. VPN Topology Manager 304 obtains a reference to VPN Storage object module 306 from VPN Configuration Manager 302 and maintains the reference for storing topology changes. Upon instantiation, VPN Topology Manager 304 registers itself as a listener with Event Service module 312 to listen for VPN topology changes. VPN Topology Manager 304 may perform one or more of the following functions: allow clients to register for VPN topology change events through the framework; notify client listeners of VPN topology changes through the framework; receive client requests for topology changes; update VPN Storage object module 306 with any changes to the VPN topology of a given view; map VPN data model topology objects to VPN details topology objects; and/or the like.

VPN Storage object module 306 is preferably instantiated by VPN Configuration Manager 302. The reference to VPN Storage object module 306 is preferably stored in VPN Configuration Manager 302 and is retrievable by VPN Topology Manager 304. VPN Storage object module 306 maintains a reference to Event Service module 312 for publishing VPN related events. VPN Storage object module 306 may also maintain a reference to VPN Datastore module 314. Preferably VPN Storage object module 306 registers itself with VPN NE Event Manager 310 as a listener for VPN related events. VPN Storage object module 306 may perform one or more of the following functions: receive client request objects, topology objects, and details objects (preferably using VPN Datastore module 314 and VPN DAO 316) in a configuration database for later retrieval; persists VPN related NE (Network Element) events and commands; control the order in which data storage takes place; retrieve the same type of data it stores; abstract VPN Configuration Manager 302 and VPN Topology Manager 304 from the details of how and where to store VPN data; abstract the VPN Network Distribution module 308 from the details of how and where to store NE events and commands; publish events to Event Service module 312 when VPN configuration or topology changes take place; and/or the like.

VPN Network Distribution module 308 is preferably instantiated by VPN Storage object module 306. The reference to VPN Network Distribution module 308 is preferably stored in VPN Storage object module 306. VPN Network Distribution module 308 retrieves and maintains references to the appropriate Network Access module 322 for the specific piece of provider equipment. Network Access module 322 provides primitives and mediation services to the VPN Network Distribution module 308 allowing it to perform one or more of the following functions: map service requests to specific NEs as per a connectivity specification; implement retry policies for failed commands; log each failure and retry; and/or the like.

VPN NE Event Manager 310 preferably maintains associations to the specific NE classes as per the connectivity specification. VPN NE Event Manager 310 maintains references to VPN Storage object module 306. VPN NE Event Manager 310 may perform one or more of the following functions: register as a listener to the NE classes as per the connectivity specification; store the NE events in the VPN Storage object module 306; map the NE events to VPN events; perform validity checking on mapping of NE events to VPN events; log any errors detected and reinstates any affected VPN data by reissuing VPN commands to VPN Storage object module 306; store valid VPN events in VPN Storage object module 306; and/or the like.

Event Service module 312 preferably maintains dynamic references to event listeners. Event Service module 312 may perform one or more of the following functions: provide publish subscribe messaging services for a predefined list of topics, including VPN topics; provide associated listener and event classes to notify interested parties of new messages; and/or the like.

VPN Datastore module 314 may perform one or more of the following functions: provide APIs for storage and retrieval of VPN data items; persists VPN data to a particular type of database; abstract VPN Storage object module 306 from the details of the particular commands for the database; support transactions; and/or the like.

A VPN DAO 316 is preferably instantiated and referenced by VPN Datastore module 314. Preferably, one VPN DAO per VPN object class per datastore is instantiated. VPN DAO 316 may perform one or more of the following functions: encapsulate knowledge of where and how to store and load Java objects of a particular class; encapsulate knowledge for retrieving multiple instances of a particular Java class; persists objects of a given class to a relational database given a handle to a vendor's relational database; and/or the like.

Figure 4:
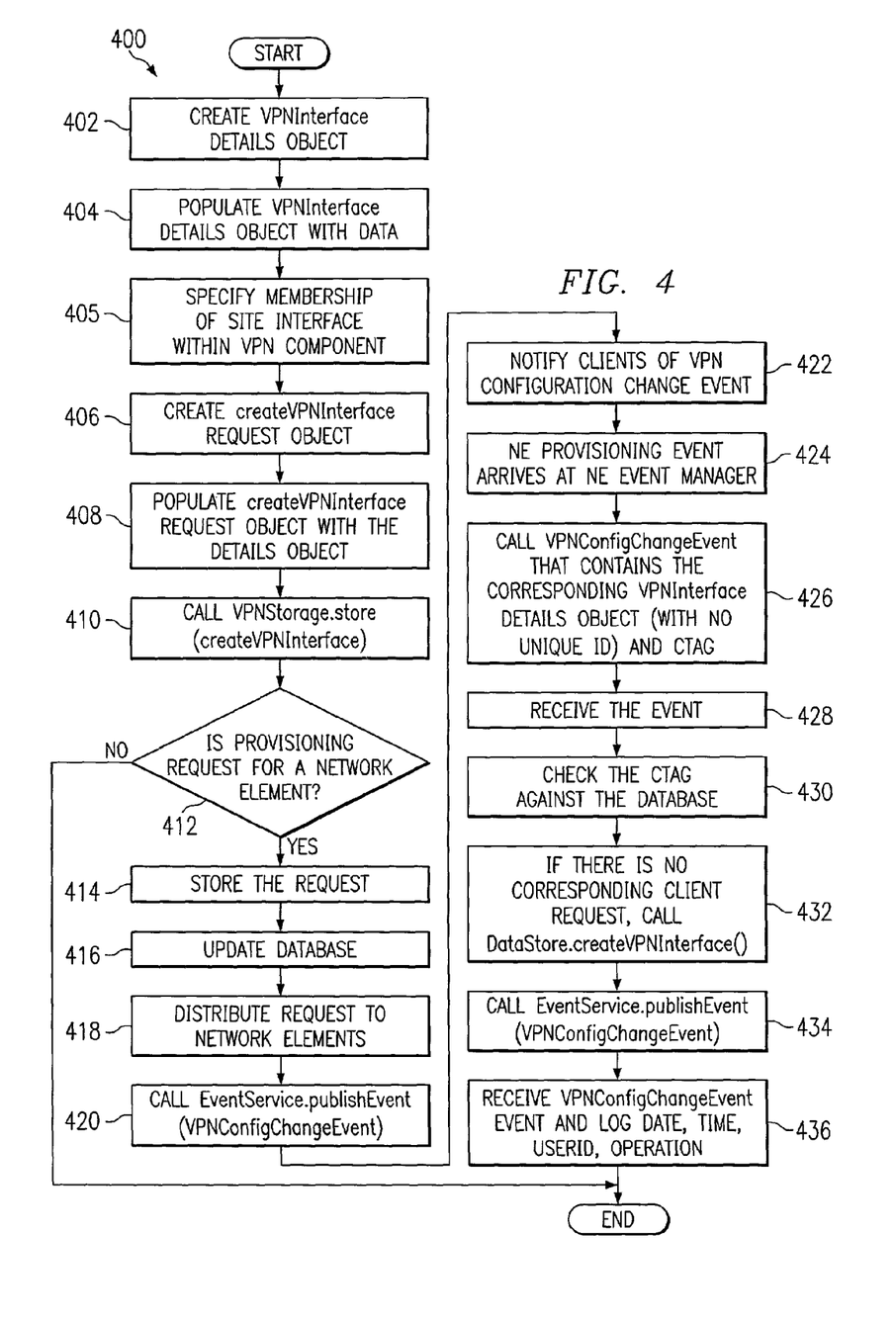
FIG. 4 shows a preferred embodiment flowchart of the present invention for creating a VPN interface.

FIG. 4 shows a preferred embodiment flowchart 400 for creating a VPN interface. As shown in FIG. 4, in step 402, a VPNInterface details object is created preferably with no ID by a client. In step 404, the VPNInterface details object is populated with data, such as user input data, client equipment (CE) interface details object and VPN details object. In step 405, membership of a site interface within a particular VPN component is specified. The role of the site within the VPN component may also be specified. Preferably, this step is performed by the client calling VPNConfigManager.createVPNInterface.

In step 406, a createVPNInterface request object is created preferably by VPN Configuration Manager 302. In step 408, the createVPNInterface request object is populated with the details object. In step 410, VPNStorage.store is called, preferably by VPN Configuration Manager 302. In step 412, a determination is made as to whether the provisioning request is for a network element. Preferably, in this step createVPNInterface.isNERequest is called by VPN Storage object module 306. If the provisioning request is not for a network element, then the request is terminated.

If the provisioning request is for a network element, then in step 414, the request is stored in database 320, preferably by VPN Storage object module 306 calling DataStore.store. In step 416, database 320 is updated, preferably by VPN Storage object module 306 calling VPNDataStore.createVPNInterface. In step 418, the request is distributed to NEs. This is preferably done by VPN Storage object module 306 calling VPNNEDistribution.createVPNInterface. In step 420, EventService.publishEvent is called, preferably by VPN Storage object module 306. In step 422, all clients are informed of the VPNConfigChangeEvent. Preferably, VPN Configuration Manager 302 receives a VPNConfigChangeEvent and notifies all clients.

In step 424, NE provisioning event arrives at VPN NE Event Manager 310. In step 426, the VPNConfigChangeEvent that contains the corresponding VPNInterface details object (with no unique ID) and a CTAG (correlation tag) is called, preferably by the VPN NE Event Manager 310. A CTAG is preferably a unique identifier assigned by the server to correlate provisioning requests, responses and events. In step 428, the event is received preferably by VPN Storage object module 306. In step 430, the CTAG is checked against database 320. If there is no corresponding client request, then in step 432 DataStore.createVPNInterface is called, preferably by VPN Storage object module 306. In step 434, EventService.publishEvent is called, preferably by VPN Storage object module 306. In step 436, a VPNConfigChangeEvent event is received, preferably by LogService. LogService also preferably logs the date, time, userid and operation performed.

Figure 5:
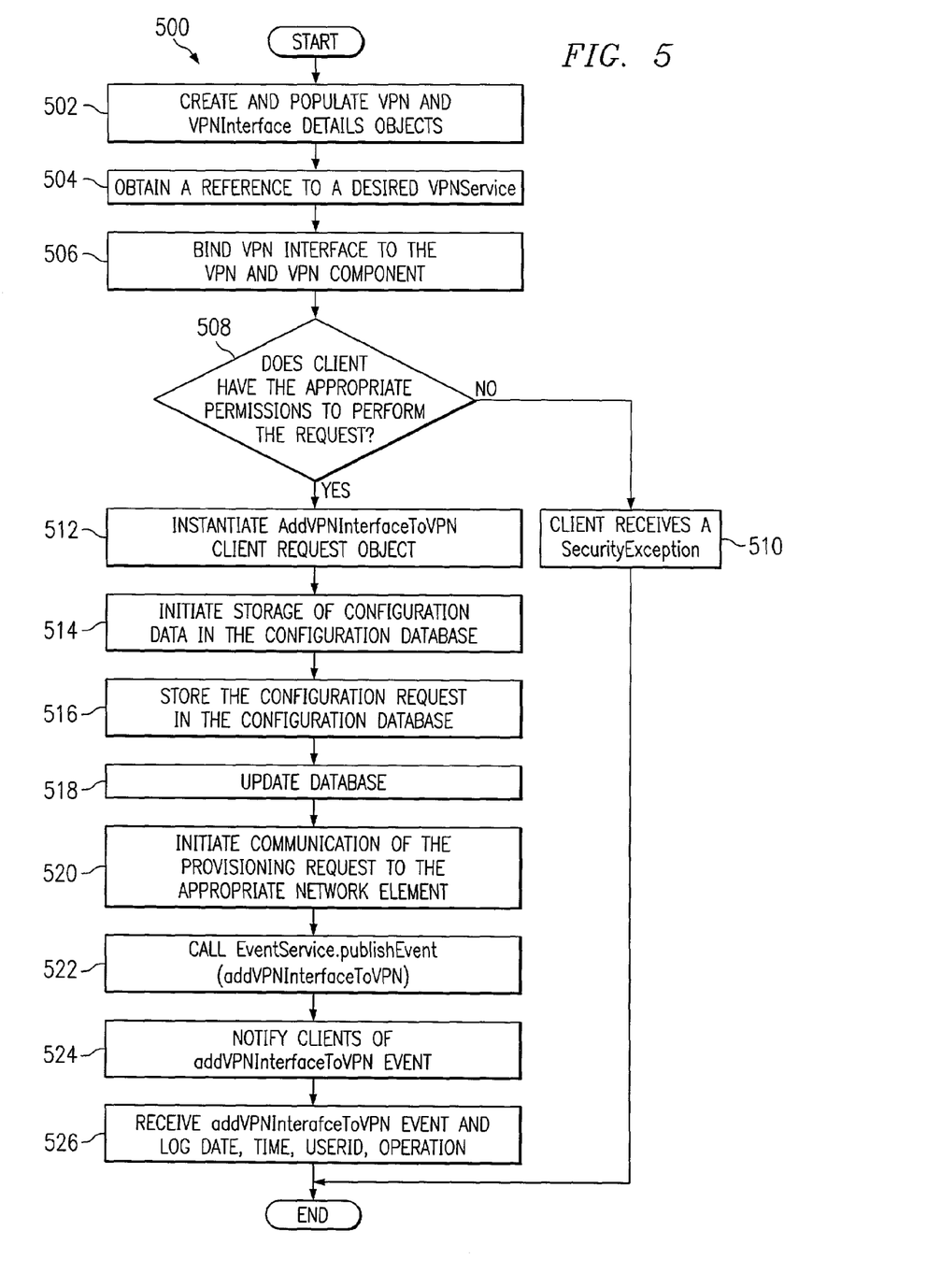
FIG. 5 shows a preferred embodiment flowchart of the present invention for adding a VPN interface to a VPN.

FIG. 5 shows a preferred embodiment flowchart 500 for adding a VPN interface to a VPN. As shown in FIG. 5, in step 502, a VPN details object and a VPNInterface details object is created and populated, preferably by a client. In step 504, a reference to a desired VPNService is obtained. Preferably, this is done by the client using a framework which provides remote access to a desired VPN Configuration Manager API. In step 506, VPNConfigManager.addVPNInterfaceToVPN is called preferably by the client to finalize the binding between the VPN interface and the corresponding VPN and VPN component. In step 508, a check is made to determine if the client has the appropriate permissions to perform the request. Preferably, a security wrapper associated with VPN Configuration Manager 302 checks to determine if the client has the appropriate permissions based on a security model document. If the client does not have the appropriate permissions, then in step 510, the client receives a SecurityException and the request is terminated.

If the client has the appropriate permissions, then in step 512, an AddVPNInterfaceToVPN client request object is instantiated, preferably by VPN Configuration Manager 302. The request object includes data from the VPN and Interface details object. In step 514, storage of the configuration data in the configuration database is initiated, preferably by VPN Configuration Manager 302 calling VPNStorage.store. In step 516, the configuration request is stored preferably in the configuration database by calling DataStore.store. In step 518, a database is updated, preferably by calling VPNDataStore.store. In step 520, communication of the provisioning request to the affected network element is initiated thereby causing the provisioning change to take effect in the network. This is accomplished preferably by VPN Storage object module 306 calling VPNNEDistribution.store. In step 522, EventService.publishEvent is called, preferably by VPN Storage object module 306. In step 524, all clients are informed of the addVPNInterfaceToVPN event. Preferably, VPN Configuration Manager 302 receives an addVPNInterfaceToVPN and notifies all clients. In step 526, an addVPNInterfaceToVPN event is received, preferably by LogService. LogService also preferably logs the date, time, userid and operation performed.

DataStore.store preferably calls ClientRequestDAO.create to create a data access object for the client request. VPNDataStore preferably calls VPNInterface.addVPN. VPNInterface preferably adds a VPNUniqueID to its member data. VPNDataStore calls VPNInterfaceDAO.update to update the data access object. VPNNEDistribution preferably computes the appropriate NE command set. VPNNEDistribution preferably calls VPNStorage.store. VPNNEDistribution preferably spawns a separate thread for NECommandSet.execute.

The NECommandSet.execute preferably sends the next NE Command to network access module 322 and to the affected network element. If the send is successful, then the provisioning operation succeeds. If the send is not successful, then the send is repeated according to a retry policy. If it is not possible to complete the send, a NECommandExecutionException is triggered with the NECommand that failed. The process is repeated for all commands in the NECommandSet.

Figure 6:
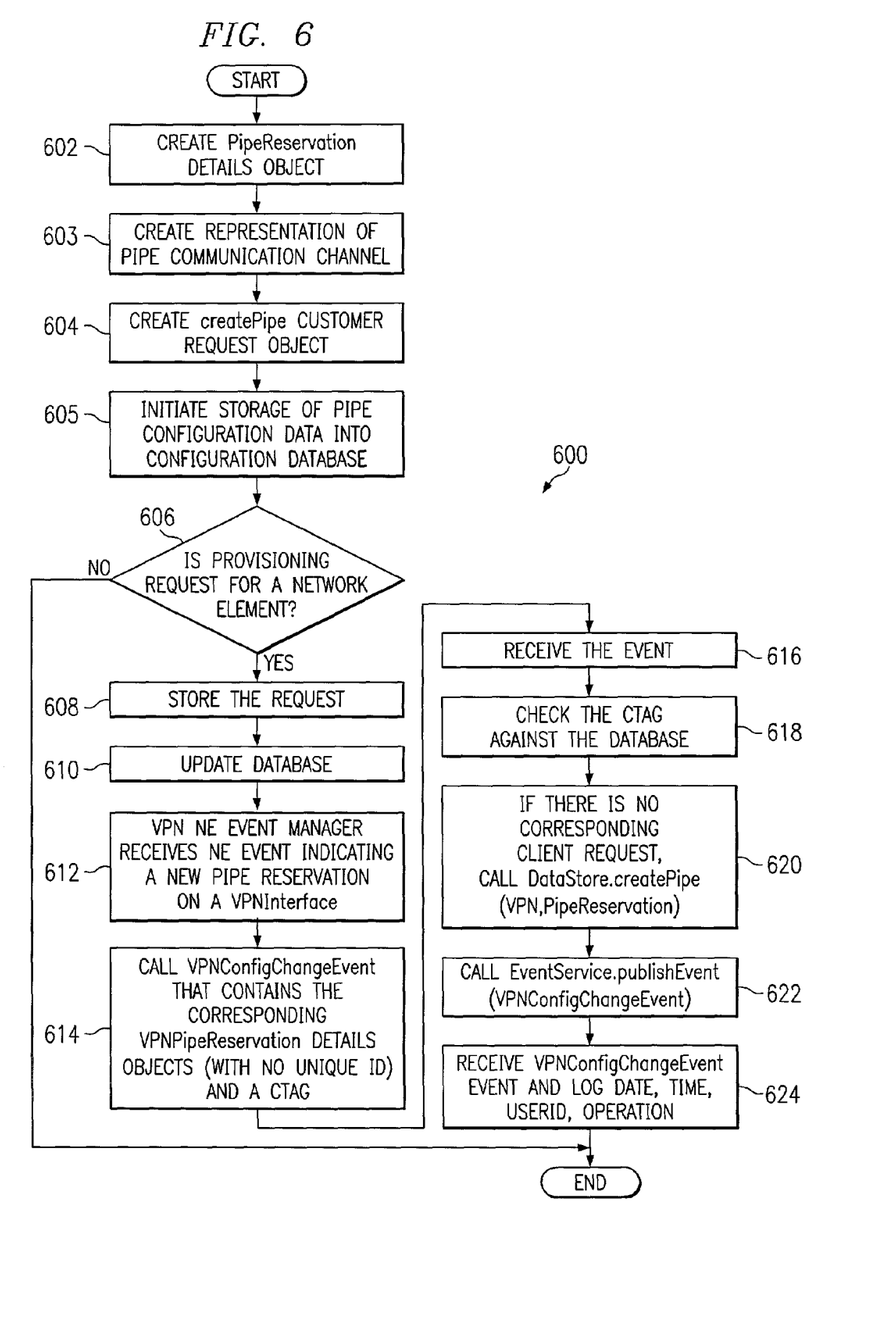
FIG. 6 shows a preferred embodiment flowchart of the present invention for adding a pipe between VPN interfaces.

FIG. 6 shows a preferred embodiment flowchart 600 for adding a pipe between VPN interfaces. As shown in FIG. 6, in step 602, a PipeReservation details object populated with user input is created, preferably by a client. In step 603, a representation of the pipe communication channel between two end points is created, preferably by the client calling VPNConfigManager.createPipe. In step 604, a createPipe customer request object is created preferably by VPN Configuration Manager 302. In step 605, storage of the pipe configuration data into the configuration database is initiated, preferably by VPN Configuration Manager 302 calling VPNStorage.store. In step 606, a determination is made as to whether the provisioning request is for a network element. Preferably, in this step createPipe.isNERequest is called by VPN Storage object module 306. If the provisioning request is not for a network element, then the request is terminated.

If the provisioning request is for a network element, then in step 608, the request is stored in database 320, preferably by VPN Storage object module 306 calling DataStore.store. In step 610, database 320 is updated, preferably by VPN Storage object module 306 calling VPNDataStore.addPipeReservationToVPNIF.

In step 612, VPN NE Event Manager 310 receives a NE Event indicating a new pipe reservation on a VPNInterface. In step 614 the VPNConfigChangeEvent that contains the corresponding VPNInterface and VPNPipeReservation details object (with no unique ID) and CTAG is called, preferably by the VPN NE Event Manager 310. In step 616, the event is received preferably by VPN Storage object module 306. In step 618, the CTAG is checked against the database. If there is no corresponding client request, then in step 620 datastore.createPipe is called, preferably by VPN Storage object module 306. In step 622, EventService.publishEvent is called, preferably by VPN Storage object module 306. In step 624, a VPNConfigChangeEvent event is received, preferably by LogService. LogService also preferably logs the date, time, userid and operation performed.

In the preferred embodiment, MCS 201 captures the intent of the provisioning operator as graphically expressed through the user interface and automatically translates it to provide topology constrained QoS provisioning. The implementation of QoS provisioning is managed as attributes of a VPN. Although the preferred embodiment of the present invention as described above contemplates an implementation of QoS guarantees that include provisioning of policing profiles and DiffServ type traffic categorization, the invention is not so limited. If desired, the present invention may be used for supporting any QoS guarantees and provisioning supported by the underlying network nodes.

While the invention has been particularly shown and described by the foregoing detailed description, it will be understood by those skilled in the art that various other changes in form and detail may be made without departing from the spirit and scope of the invention.

What is claimed is:

1. In a network comprised of a plurality of network elements, a computer implemented method for provisioning Quality of Service (QoS) between a plurality of sites comprising a Virtual Private Network (VPN) interconnected by certain ones of the plurality of network elements, comprising:
    enabling graphically defining topographical relationships between said plurality of sites of said VPN by instantiating on a computer one or more objects representing VPN components each specifying either a mesh configuration or a hub-spoke configuration for said VPN sites, and permitted communication between the sites, the topographical relationships defining rules governing communication between the plurality of sites by constraining distribution of routes for the VPN to certain ones of the plurality of network elements;
    enabling graphically defining on the computer of at least one QoS rule for only packet flows within defined topographical relationships between said plurality of sites of said VPN; and
    automatically generating provisioning information for the at least one QoS rule for at least one of the network elements.

2. The method of claim 1, wherein enabling graphically defining of at least one QoS rule comprises enabling graphically specifying at least one policing rule.

3. The method of claim 2, wherein enabling graphically specifying at least one policing rule comprises graphically specifying at least one parameter selected from the group consisting of an ICR (Ingress Commit Rate), an IPR (Ingress Peak Rate), an ECR (Egress Commit Rate), an EPR (Egress Peak Rate), an ICTBS (Ingress Commit Token Bucket Size), an IPTBS (Ingress Peak Token Bucket Size), an ECTBS (Egress Commit Token Bucket Size) and an EPTBS (Egress Peak Token Bucket Size).

4. The method of claim 1, wherein enabling graphically defining of at least one QoS rule comprises enabling graphically specifying at least one differentiated services (DiffServ) rule.

5. The method of claim 4, further comprising updating said at least one DiffServ rule by dragging and dropping a preconfigured DiffServ template on a graphical link.

6. The method of claim 4, further comprising displaying a dialog box for updating said DiffServ rule in response to selection of a graphical link.

7. The method of claim 4, wherein enabling graphically specifying at least one DiffServ rule comprises graphically specifying at least one parameter selected from the group consisting of a Differentiated Services Code Point (DSCP) map and a set of characteristics of an Internet Protocol (IP) header.

8. The method of claim 4, wherein enabling graphically specifying at least one DiffServ rule comprises graphically specifying a set of characteristics of an Internet Protocol (IP) header, said set comprising a protocol, an address and port of a first one of the plurality of sites, an address and port of a second one of the plurality of sites.

9. The method of claim 1, wherein the provisioning information allows sites connected in a mesh configuration to exchange packets with one another, while restricting exchange of packets between sites connected in a hub-spoke configuration.

10. The method of claim 9, wherein restricting exchange of packets between sites connected in a hub-spoke configuration includes allowing a site which is a hub to exchange packets with any spoke of that component, while only allowing a site which is a spoke to exchange packets with the hub of that component.

11. A system for provisioning Quality of Service (QoS) of a plurality of sites of a Virtual Private Network (VPN), comprising:
    a graphical user interface, comprising:
        a display area graphically displaying at least one VPN component of said VPN, the VPN component defining a topography specifying either a mesh configuration or a hub-spoke configuration; and
        a customer area displaying said plurality of sites, at least one of said plurality of sites operable to be dragged from said customer area to said display area, wherein dropping of said at least one site on a graphical representation of said at least one VPN component causes said at least one site to be displayed in said display area and to become a member of said VPN component;
    means for graphically defining at least one QoS rule for packet flows within the VPN between at least one pair of sites of said plurality of sites of said VPN based at least in part on a membership of said pair of sites; and
    means for automatically generating provisioning information for the at least one QoS rule for a network element.

12. The system of claim 11, wherein said means for graphically defining at least one QoS rule comprises means for graphically specifying at least one policing rule between at least said pair of sites.

13. The system of claim 11, wherein said means for graphically defining at least one QoS rule comprises means for graphically specifying at least one differentiated services (DiffServ) rule between at least said pair of sites.

14. The system of claim 13, further comprising means for dragging and dropping a preconfigured DiffServ template on a graphical link between said pair of sites to update said at least one DiffServ rule.

15. The system of claim 13, said graphical user interface further comprising a dialog box for updating said Diffserv rule in response to selection of a graphical link between said pair of sites.

16. A method for provisioning Quality of Service (QoS) of a plurality of sites of a Virtual Private Network (VPN), comprising:
    graphically displaying at least one VPN component of said VPN, the VPN component defining a VPN topography specifying either a mesh configuration or a hub-spoke configuration and having associated with it at least one route target attribute;
    enabling dragging of a representation of at least one site of said plurality of sites towards said at least one VPN component;
    enabling dropping of said representation of said at least one site on said representation of said at least one VPN component thereby causing said site to become a member of said VPN component;
    enabling graphically defining of at least one QoS rule for at least one pair of sites of said plurality of sites of said VPN based at least in part on a membership of said pair of sites; and automatically generating a provisioning information for the QoS rule for a network element.

17. The method of claim 16, wherein enabling graphically defining of at least one QoS rule comprises:
    enabling graphically specifying at least one policing rule between at least said pair of sites; and
    enabling graphically specifying at least one differentiated services (DiffServ) rule between at least said pair of sites.

18. In a network comprised of a plurality of network elements, a computer readable medium, excluding transitory signals, storing instructions for performing a method for provisioning Quality of Service (QoS) between a plurality of sites comprising a Virtual Private Network (VPN) interconnected by certain ones of a plurality of network elements in a network, the method comprising:
    enabling graphically defining topographical relationships between said plurality of sites of said VPN by instantiating on a computer one or more objects representing VPN components, each VPN component having associated with it at least one route target attribute, and each VPN component specifying either a mesh configuration or a hub-spoke configuration for said VPN sites, and permitted communication between the sites, the topographical relationships defining rules governing communication between the plurality of sites by constraining distribution of routes for the VPN to certain ones of the plurality of network elements; and
    enabling graphically defining on the computer of at least one QoS rule for only packet flows within defined topographical relationships between said plurality of sites of said VPN; and
    automatically generating provisioning information for the QoS rules for at least one of the network elements.

19. The computer readable medium, excluding transitory signals, of claim 18, wherein enabling graphically defining of at least one QoS rule comprises enabling graphically specifying at least one policing rule.

20. The computer readable medium of claim 19, wherein enabling graphically specifying at least one policing rule comprises graphically specifying at least one parameter selected from the group consisting of an ICR (Ingress Commit Rate), an IPR (Ingress Peak Rate), an ECR (Egress Commit Rate), an EPR (Egress Peak Rate), an ICTBS (Ingress Commit Token Bucket Size), an IPTBS (Ingress Peak Token Bucket Size), an ECTBS (Egress Commit Token Bucket Size) and an EPTBS (Egress Peak Token Bucket Size).

21. The computer readable medium, excluding transitory signals, of claim 18, wherein enabling graphically defining of at least one QoS rule comprises enabling graphically specifying at least one differentiated services (DiffServ) rule.

22. The computer readable medium of claim 21, wherein the method further comprises updating said at least one DiffServ rule by dragging and dropping a preconfigured DiffServ template on a graphical link.

23. The computer readable medium of claim 21, wherein the method further comprises displaying a dialog box for updating said DiffServ rule in response to selection of a graphical link.

24. The computer readable medium of claim 21, wherein enabling graphically specifying at least one DiffServ rule comprises graphically specifying at least one parameter selected from the group consisting of a Differentiated Services Code Point (DSCP) map and a set of characteristics of an Internet Protocol (IP) header.

25. The computer readable medium of claim 21, wherein enabling graphically specifying at least one DiffServ rule comprises graphically specifying a set of characteristics of an Internet Protocol (IP) header, said set
    comprising a protocol, an address and port of a first one of the plurality of sites, an address and port of a second one of the plurality of sites.

* * * * *